(12) United States Patent
Bowden-Peters et al.

(10) Patent No.: US 11,958,627 B2
(45) Date of Patent: Apr. 16, 2024

(54) OPERATING A MUNITIONS SYSTEM

(71) Applicant: MBDA UK LIMITED, Stevenage (GB)

(72) Inventors: Edwin John William Bowden-Peters, Stevenage (GB); Ben Cook, Stevenage (GB)

(73) Assignee: MBDA UK LIMITED, Stevenage (GB)

( * ) Notice: Subject to any disclaimer, the term of this patent is extended or adjusted under 35 U.S.C. 154(b) by 243 days.

(21) Appl. No.: 17/430,924

(22) PCT Filed: Feb. 14, 2020

(86) PCT No.: PCT/GB2020/050357
§ 371 (c)(1),
(2) Date: Aug. 13, 2021

(87) PCT Pub. No.: WO2020/165606
PCT Pub. Date: Aug. 20, 2020

(65) Prior Publication Data
US 2022/0135226 A1 May 5, 2022

(30) Foreign Application Priority Data
Feb. 15, 2019 (GB) ..................... 1902101

(51) Int. Cl.
*B64D 7/08* (2006.01)
*B64D 1/06* (2006.01)
(Continued)

(52) U.S. Cl.
CPC ............... *B64D 7/08* (2013.01); *B64D 1/06* (2013.01); *F41F 3/06* (2013.01); *G01V 3/101* (2013.01); *F41G 7/007* (2013.01)

(58) Field of Classification Search
CPC . G06F 16/00; G06K 19/00; B64D 1/06; F41F 3/06; G01V 3/101
(Continued)

(56) References Cited

U.S. PATENT DOCUMENTS

| 5,201,658 A | 4/1993 | Taylor et al. |
| 6,535,143 B1 | 3/2003 | Miyamoto et al. |

(Continued)

FOREIGN PATENT DOCUMENTS

| CN | 202041119 U | 11/2011 |
| DE | 3903639 A1 | 8/1990 |

(Continued)

OTHER PUBLICATIONS

International Search Report and Written Opinion received for PCT Patent Application No. PCT/GB2020/050357, dated May 19, 2020, 12 pages.

(Continued)

*Primary Examiner* — Edwyn Labaze
(74) *Attorney, Agent, or Firm* — FAEGRE DRINKER BIDDLE & REATH LLP

(57) ABSTRACT

The invention relates to a method of determining the relative positions of components of a munitions system, the munitions system comprising a first component (331) and at least one second component (333). The method comprises monitoring the output of a resonant circuit (305) provided on a first component (331), the resonant circuit (305) having a resonant frequency, detecting a change in the output due to a change in the resonant frequency caused by a change in the relative positions of the first component (331) and the at least one second component (333), and using the detected change to determine that the at least one second component (333) has moved relative to the first component (331).

18 Claims, 7 Drawing Sheets

(51) Int. Cl.
*F41F 3/06* (2006.01)
*F41G 7/00* (2006.01)
*G01V 3/10* (2006.01)

(58) Field of Classification Search
USPC .............................................. 235/375, 487
See application file for complete search history.

(56) References Cited

U.S. PATENT DOCUMENTS

| 2005/0162158 | A1  | 7/2005  | Del Monte |
|---|---|---|---|
| 2016/0377647 | A1* | 12/2016 | Fertig ..................... G01P 21/00 73/1.38 |
| 2018/0123485 | A1* | 5/2018  | Rastegar ................ H02N 2/183 |

FOREIGN PATENT DOCUMENTS

| EP | 0988625 | A1 | 3/2000 |
|---|---|---|---|
| EP | 1666835 | A1 | 6/2006 |
| EP | 3298342 | A1 | 3/2018 |
| JP | 56-111413 | A | 9/1981 |
| JP | 56-160605 | A | 12/1981 |
| JP | 60-066854 | A | 4/1985 |
| JP | 61-186999 | A | 8/1986 |
| JP | 04-087418 | A | 3/1992 |
| JP | 2000-077993 | A | 3/2000 |
| JP | 2001-165603 | A | 6/2001 |
| JP | 2006-208331 | A | 8/2006 |
| JP | 2006-246289 | A | 9/2006 |
| JP | 2006-317387 | A | 11/2006 |
| JP | 2007-141762 | A | 6/2007 |
| JP | 2008-036638 | A | 2/2008 |
| JP | 2010-091265 | A | 4/2010 |
| JP | 2017-045511 | A | 3/2017 |
| JP | 2017-067670 | A | 4/2017 |
| WO | 2016/189283 | A1 | 12/2016 |

OTHER PUBLICATIONS

MIL-STD-1760E, Department of Defense Interface Standard, Aircraft/Store Electrical Interconnection System, Oct. 24, 2007, 219 pages.

* cited by examiner

OPERATING A MUNITIONS SYSTEM

FIELD

The present invention concerns munitions systems, and in particular, methods and apparatus for determining the relative positions of components of a munitions system, by detecting a change in a resonant frequency of a circuit.

BACKGROUND

In munitions systems, for example, systems for deploying munition from aircraft or rocket launchers, or for deploying sub-munition from a larger munition or from a canister, it is desirable to determine relative positions of components of the system.

For example, it is desirable to be able to determine the relative positions of stores and launch platforms, and to determine whether a store has separated from a launch platform. This enables reliable determination of whether or not the store may be safely triggered or activated. If the munitions system comprises components that are moveable relative to each other, for example wings or flaps on the launch platform, it is desirable to be able to determine and track the relative positions of the components.

Various methods are known for determining whether a store has separated from a launch platform. To meet safety requirements, and to ensure reliable determination of the separation, multiple methods are often used in parallel.

Electrical continuity methods are known, which use a wire break to indicate separation of a store and a launch platform: when the store is attached to the launch platform, a wire passes from the store to the platform and back again; when the store separates from the platform, the wire breaks, causing a loss of electrical connection. Detection of a loss of electrical connection therefore indicates separation of the store and the platform, and hence indicates that the store has been deployed. An example of such a method is described in the MIL-STD-1760 Standard. Electrical continuity methods can be unreliable. Also, they can easily be tampered with, for example by creating an additional electrical connection between the store and the launch platform.

Acceleration profiling methods are also known. These methods rely on the detection of a shock resulting from the ejection or launch of a store from a launch platform, in order to determine when the store has separated from the launch platform. Acceleration profiling methods can be used in conjunction with other methods (for example, with the electrical continuity method described above). However, acceleration profiling methods are of limited use when the store is deployed under gravity, or when the store is deployed simultaneously with other events that could give rise to similar shocks.

There remains a need in the field for improved and more reliable methods and apparatus for determining the relative positions of components of a munitions systems.

SUMMARY

The present invention provides, according to a first aspect, a method according to claim 1.

The present invention also provides, according to a second aspect, a component for a munitions system according to claim 11.

The present invention also provides, according to a third aspect, a first component and a second component of a munitions system according to claim 15.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 6(*b*) is a front view of an aircraft comprising the wing of FIG. 6(*a*) according to an embodiment of the invention.

DETAILED DESCRIPTION

Figure 1:
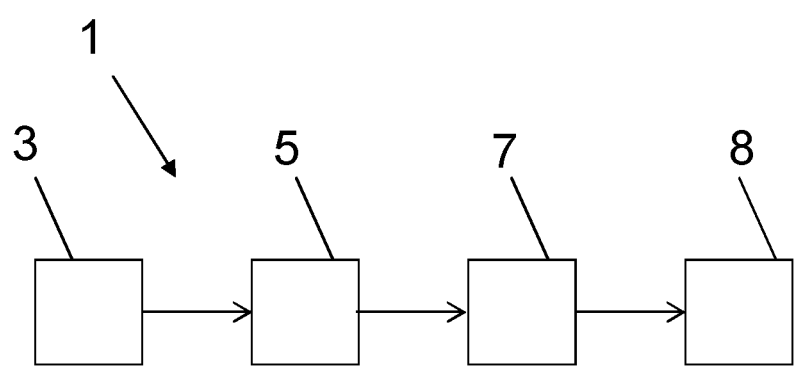
FIG. 1 is a schematic diagram of a circuit for use in a method of determining the relative positions of components of a munitions system, according to an example embodiment of the invention.

According to a first aspect, the present invention provides a method of determining the relative positions of components of a munitions system. The munitions system comprises a first component (i.e. at least one first component) and at least one second component. The method comprises monitoring the output of a resonant circuit provided on the first component, the resonant circuit having a resonant frequency, detecting a change in the output due to a change in the resonant frequency caused by a change in the relative positions of the first component and the at least one second component, and using the detected change to determine that the at least one second component has moved relative to the first component.

The change in the resonant frequency may be caused by a change in the inductance of the resonant circuit.

The method may further comprise providing a signal having an oscillation frequency to the resonant circuit wherein the oscillation frequency of the signal is closer to the resonant frequency of the resonant circuit when the first component is distant from the at least one second component than when the first component is within close proximity to the at least one second component. The oscillation frequency of the signal may match the resonant frequency of the resonant circuit when the first component is distant from the at least one second component. The separation at which the oscillation frequency and the resonant frequency will match will of course depend on parameters of the circuit including the amplitude of the signal. To give an example, the oscillation frequency of the signal may match the resonant frequency when the first component is between 30 mm and 50 cm from the at least one second component.

The method may further comprise monitoring the resonant frequency of the resonant circuit over a period of time, and using the detected changes in the resonant frequency to determine the movement of the at least one second component relative to the first component.

Using the detected change to determine whether the at least one second component has moved relative to the first component may comprise determining whether the first component has separated from the at least one second component.

Using the detected change to determine whether the at least one second component has moved relative to the first component may comprise determining the separation distance and/or angle of separation between the first component and the at least one second component.

The first component may comprise at least two resonant circuits, each circuit having a resonant frequency. The method may further comprise monitoring the output of each of the at least two resonant circuits, detecting a change in the output of at least one of the resonant circuits caused by a change in the relative positions of the first component and the at least one second component, and using the detected change to determine the angle or orientation of the at least one second component relative to the first component. The at least two resonant circuits may have the same resonant frequencies or different resonant frequencies. To give an example, first and second resonant circuits having the same resonant frequency may be spatially separated on the first component. Initially, a second component may be positioned equidistant to the first and second resonant circuits. If the second component becomes angled with respect to the first component, it may be at a different distance from the first and second resonant circuits. By detecting the change output of the two resonant circuits, the angle of the second component relative to the first component may be determined.

The method may further comprise monitoring the output of a plurality of resonant circuits provided on the first component, detecting a change in the output of each of the plurality of resonant circuits caused by separation of the store from the launch platform, and using the detected change from each circuit to determine that the at least one second component has moved relative to the first component. Monitoring a plurality of resonant circuits may provide a safety check. The plurality of resonant circuits may be monitored to ensure that their output is consistent. Alternatively, the plurality of resonant circuits may be spatially separated. The output of each resonant circuit output may be indicative of the position of different regions of a second component, or, in the event of multiple second components, may be indicative of the positions of the second components.

The first component and second component may be parts of a vehicle that are rotatable relative to each other. By way of example, the first component may be part of an aircraft main body or part of a fixed aircraft wing, and the at least one second component may be part of an aircraft wing or flap that is rotatable relative to the main body of the aircraft, or vice versa.

The method may further comprise using the detected change to determine whether the at least second component has rotated relative to the first component, or vice versa. Rotation of the at least one second component relative to the first component may result in a change of separation distance and/or change in angle of separation between the first component and the at least one second component, and this may result in a change in output of a resonant circuit. For example, if a wing is in a folded state, the angle of separation and distance of separation of a component provided on the wing will change relative to a component provided on the main aircraft body, compared to when the wing is in an unfolded, or extended state.

The first component may be a store or a launch platform, and the at least one second component may be the other of a store or a launch platform. For example, the first component may be a store, a launch platform, a canister, a wing, a fin, a flap, or a barrel. The launch platform may be a land vehicle, a water vehicle, an aircraft, a man-made portable launcher, a munition, a railing, a hanger, a barrel or a canister. The store may be a munition or a sub munition.

By way of example, the method may be a method of determining whether canisters are installed onto a vehicle at the correct angle, a method of determining the orientation of a wing/fin or flap relative to the main body of a vehicle, a method of determining whether a munition has separated from a launch platform, or a method of determining whether a sub-munition has separated from a munition.

The method may be a method of determining whether a store has separated from a launch platform. The method may comprise monitoring the output of a resonant circuit provided on the store or the launch platform, the resonant circuit having a resonant frequency, detecting a change in output due to a change in the resonant frequency caused by a separation of the store from the launch platform, and using the detected change to determine the store has separated from the launch platform. The change in the resonant frequency may be caused by a change in the inductance of the resonant circuit The method may further comprise providing a signal having an oscillation frequency to the resonant circuit, wherein the resonant frequency of the resonant circuit is closer to the oscillation frequency of the signal when the store is distant from the launch platform than when the store is within close proximity of the launch platform. The oscillation frequency of the signal may match the resonant frequency of the resonant circuit when the store is distant from the launch platform. The oscillation frequency of the signal may match the resonant frequency of the resonant circuit when the store is between 30 mm and 50 cm from the launch. The point at which the oscillation frequency of the resonant signal matches the resonant frequency of the resonant circuit may provide an indicator that the store is a safe distance from the launch platform.

The method may further comprise monitoring the output of a plurality of resonant circuits provided on the store or the launch platform, detecting a change in the output of each of the plurality of resonant circuits caused by separation of the store from the launch platform, and using the detected change from each circuit to determine that the store has separated from the launch platform.

The method may further comprise monitoring the resonant frequency of the resonant circuit over a period of time, and using detected changes in the resonant frequency to determine the distance and/or angle of separation between the store and the launch platform.

According to a second aspect, there is also provided a component for a munitions system. The component comprises a signal generator for generating a signal, a resonant circuit having a resonant frequency and operably connected to receive the signal from the signal generator and to provide an output, a monitor operably connected to monitor the output of the resonant circuit, and an indicator operably connected to the monitor and configured to indicate that the output of the resonant circuit has changed. The resonant circuit is configured so that its resonant frequency changes when a conductor or other inductance-influencing object moves relative to the component. For example, when the conductor or other inductance-influencing object is in close proximity to the resonant circuit, the conductor or inductance-influencing object may influence magnetic flux or inductance of the resonant circuit, thereby changing the resonant frequency of the resonant circuit.

The signal generator may provide a signal having an oscillation frequency to the resonant circuit. If the signal has a non-sinusoidal shape, it will have a band of frequencies centred around the fundamental oscillation frequency; references herein to "the frequency of the signal" or "the oscillation frequency" will be understood by the skilled person to refer to the fundamental oscillation frequency. The signal may be a square wave signal. The signal may oscillate between a positive and negative voltage, to avoid permanently magnetising the inductor of the resonant circuit.

The signal from the signal generator may have a frequency of less than 1 Mhz. The frequency of the signal from the generator may between 1 kHz and 100 kHz, or between 1 kHz and 50 kHz. Advantageously, if the signal generator provides a low frequency signal, for example between 1 kHz to 50 kHz, the signal may be easily distinguishable from high frequency noise. A higher frequency signal may have a smaller detection range for detecting the effects of conductors or inductance influencing objects, but may, for example, allow enable a smaller coil to be used for the resonant circuit.

The resonant circuit is operably connected to receive the signal from the signal generator and to provide an output. The signal generator may be connected in series with the resonant circuit. The resonant circuit may include an inductor or an inductance coil. The resonant circuit may include an air-cored coil, a ferrite-cored coil or a printed or etched coil, for example an inductor on a PCB. The shape of the coil may be selected to be appropriate for detecting a certain type of component. Different shaped coils will give rise to different shaped electromagnetic fields, and may be appropriate for detecting the positions of different shaped components. By way of example, if the resonant circuit is provided in a canister tube and is being used to detect when a cylindrical munition has separated from the tube, the resonant circuit may comprise a relatively long and thin coil.

The resonant circuit may include an inductor or an inductance coil.

The monitor may include a comparator and a switch connected for activation by the comparator. The comparator-activated switch is operably connected to the indicator and is configured to be activated if the comparator detects that the output of the resonant circuit has crossed a threshold level. The monitor may be operably connected to monitor the output of the resonant circuit. The monitor may include a comparator operably connected to the resonant circuit, and a switch connected for activation by the comparator, wherein the comparator-activated switch is operably connected to the indicator, and is configured to be activated if the comparator detects that the output of the resonant circuit has crossed a threshold level.

The monitor may include a filter. The filter may include a time delay circuit element that is configured to prevent the indicator from being activated by initial surges in a rectifier output. The monitor may include a low pass filter operably connected to block signals, for example signals having a frequency higher than the cut-off frequency of the filter, or for example, signals outside of the passband of the filter, or for example, high frequency noise, from reaching the comparator. The cut-off frequency of the low pass filter may be 1 MHz. The cut-off frequency of the low pass filter may be 100 kHz, or any frequency greater than the oscillation frequency of the signal provided by the signal generator. The cut-off frequency may be slightly above the oscillation frequency of the signal provided by the signal generator; for example, the cut-off frequency may be 10 kHz to 100 kHz above the oscillation frequency, to improve the elimination of noise. Alternatively, the monitor may include a band pass filter connected in series with the resonant circuit. A band pass filter may be operably connected to block unwanted signals having a frequency outside the passband of the filter, for example, high and low frequency noise, from reaching the comparator.

The monitor may include a signal-generator-monitoring switch operably connected to the signal generator and to the indicator. The signal-generator monitoring switch is configured to be OFF in the absence of a signal from the signal generator, and thereby to prevent the indicator from activating in the absence of a signal from the signal generator. The indicator, which is configured to be activated when the store has separated from the launch platform, may be an alarm, which may be an audible alarm, or the indicator may be a visual indicator.

The component may be a store, a launch platform, a canister, a wing, a fin, or a barrel. The launch platform may be a land vehicle, a water vehicle, an aircraft, a man-portable launcher, a munition, a railing, a hanger, a barrel, or a canister. The store may be a munition or a sub-munition. The store or launch platform may comprise a signal generator for generating a signal; a resonant circuit having a resonant frequency and operably connected to receive the signal from the signal generator and to provide an output; a monitor operably connected to monitor the output of the resonant circuit; and an indicator operably connected to the monitor and configured to indicate that the output of the resonant circuit has changed, wherein the resonant circuit is configured so that its resonant frequency changes when a conductor or other inductance-influencing object separates from the launch platform or the store.

According to a third aspect, the invention provides a first component and a second component of a munitions system. The second component includes a conductor or inductance-influencing object. The first component is a component comprising any of the apparatus features set out above. The conductor or inductance-influencing object is arranged to cause a difference in the resonant frequency of the resonant circuit when the second component and the first component move relative to one another.

The conductor or inductance-influencing object may comprise a metal, carbon fibre material or a glass fibre material having conducting reinforcing struts or screws.

The inductance-influencing object may include an LC circuit arranged to alter the magnetic flux of the resonant circuit provided on the store or launch platform.

The first component and the second component may comprise a store and a launch platform. The launch platform or the store may include a conductor or inductance-influencing object, and the other of the store and the launch platform may be a store or a launch platform comprising any of the apparatus features set out above. The conductor or inductance-influencing object may be arranged to cause a shift in the resonant frequency of the resonant circuit when the store and the launch platform are in close proximity to each other from when the store and the launch platform are separate from each other. The store may be attached to the launch platform prior to separation, or may be integrated with the launch platform using a contactless arrangement.

The conductor or inductance-influencing object may comprise metal, for example, pure ferrite or a nickel-iron alloy or may comprise another high magnetic permeability material, a carbon fibre material, or a glass fibre material having conducting reinforcing struts or screws. For example, the store or munition may include a casing made of metal carbon fibre material or glass fibre material having conducting reinforcing struts or screws.

The inductance-influencing object may include an LC circuit arranged to alter the magnetic flux of the resonant circuit provided on the store or the launch platform. The LC circuit may cause a difference in the resonant frequency of the resonant circuit when the store and the launch platform are in close proximity to each other from when the store and the launch platform are separate from each other.

Monitoring a shift in the resonant frequency of the resonance circuit as the first component separates from the at least one second component may provide an indication of the separation distance and or/angle of the store from the launch platform. A shift in the resonant frequency of the resonant circuit may change monotonically with the separation distance of the first component from the at least one second component. The shift in resonant frequency may arise from a change in inductance of the resonant circuit as the first component separates from the at least one second component. The amplitude of the signal that is passed to the low pass filter will be dependent upon the difference between the resonant frequency of the resonant circuit and the oscillation frequency of the signal generator. Therefore by monitoring the shift in frequency of the resonant circuit, for example by monitoring the amplitude of the signal that is passed to the low pass filter, or by monitoring another suitable signal in the circuit, for a period of time as the store separates from the launch platform, the separation distance between the first component and the at least one second component may be determined. The distance of the first component from the at least one second component may be more accurately determined if the store includes an LC circuit that influences the resonant frequency of the resonant circuit when the first component is in close proximity to the at least one second component. The LC circuit may influence the inductance of the resonant circuit. The range over which the separation of the first component from the at least one second component can be detected will be dependent upon the resonant frequency and transmission power of the resonant circuit.

In an example embodiment of the invention (FIG. 1), a circuit 1 includes a signal generator 3 for generating a signal; a resonant circuit 5 having a resonant frequency and operably connected to receive the signal from the signal generator 3 and to provide an output; a monitor 7 operably connected to monitor the output of the resonant circuit 5; and an indicator 8 operably connected to the monitor 7 and configured to indicate that the output of the resonant circuit 5 has changed, wherein the resonant circuit 5 is configured so that its resonant frequency changes when a conductor or other inductance-influencing object (not shown in FIG. 1) moves relative to the component comprising the resonant circuit (not shown in FIG. 1).

Figure 2:
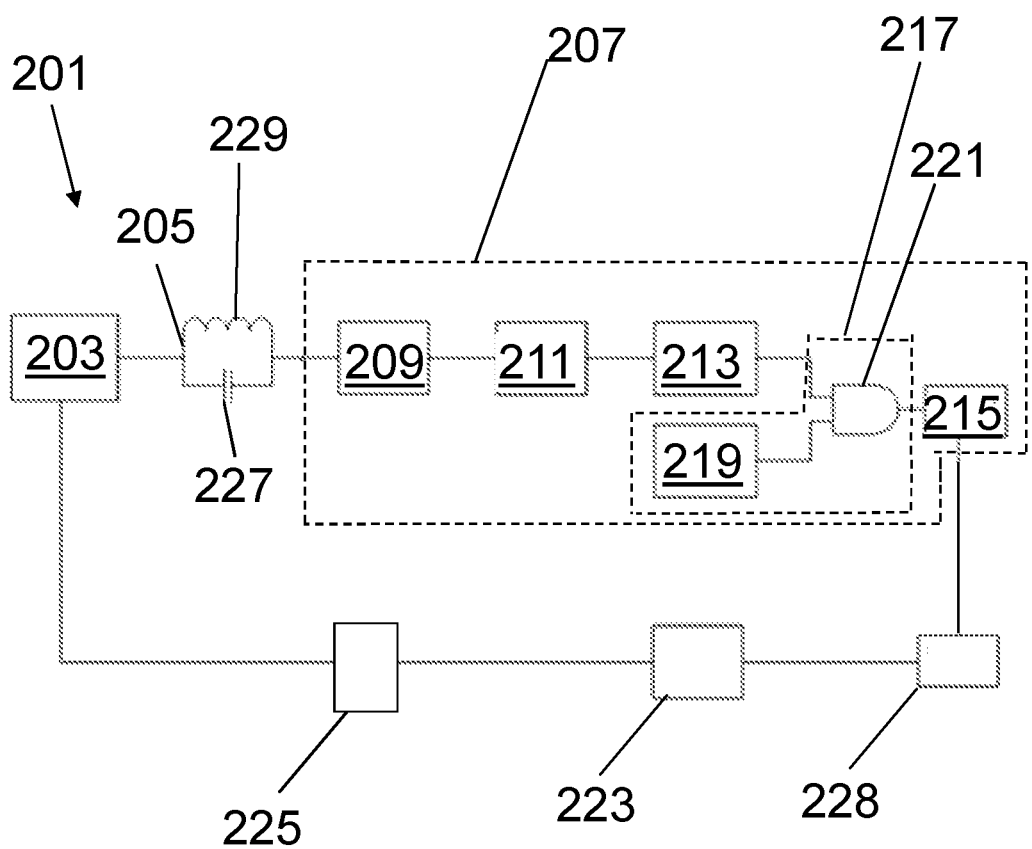
FIG. 2 is a schematic diagram of a circuit for use in a method of determining whether a first component has separated from at least one second component, according to a second example embodiment of the invention.

In an example embodiment of the invention (FIG. 2), a circuit 201 includes a signal generator 203 for generating a signal. The signal generator is connected in series with a resonant circuit 205, and the resonant circuit 205 is operably connected to receive the signal from the signal generator 203 and to provide an output. The circuit 201 includes a monitor 207, operably connected to monitor the output of the resonant circuit 205. The monitor 207 includes a low pass filter 209, a rectifier 211 and a comparator 213, which are connected in series with the resonant circuit 205. The monitor 207 also includes a switch 215, which is connected for activation by the comparator 213. The monitor 207 also includes a filter 217, which includes a time delay circuit element 219, and an AND gate 221. The AND gate 221 connects both the comparator 213 and the time delay circuit element 219 to the switch 215. The circuit 201 also includes a signal-generator-monitoring switch 223 and a charge pump 225, which are connected in series with the signal generator 203. The monitor 207 and the signal-generator-monitoring switch 223 are connected to an indicator 228.

When the circuit 201 is in use, the signal generator 203 generates a square wave signal with an oscillation frequency $\omega_1$. The resonant circuit 205 includes a capacitor 227 and an inductor 229, and the resonant frequency $\varphi_r$ of the resonant circuit 205 is a function of the capacitance of a capacitor 227 and the inductance of the inductor 229. The signal generated by the signal generator 203 oscillates between a positive and negative voltage, in order to avoid permanent magnetisation of the inductor 229. The resonant circuit 205 is tuned such that, in the absence of a conductor or inductance-influencing object in close proximity to the circuit, the resonant frequency ($\omega_r$) of the resonant circuit 205 matches the oscillation frequency ($\omega_1$) of the signal generator 203, i.e. $\omega_1 = \omega_r$.

A conductor, or other inductance-influencing object (not shown in FIG. 2) will cause a change in the resonant frequency of the resonant circuit 205 when in close proximity to the inductor 229. When a conductor, or other inductance-influencing object is in close proximity to the inductor 229, eddy currents generated in the conductor or inductance-influencing object will influence the magnetic flux of the inductor 229 and will cause a shift in the resonant frequency of the resonant circuit. The shift in resonant frequency may be due to a change in the inductance of the inductor. When a conductor is proximal to the inductor 229, the resonant frequency of the resonant circuit 205 will not match the oscillation frequency of the signal generator 203 (i.e. $\omega_1 \neq \omega_r$).

An output from the resonant circuit 205 is passed to the low pass filter 209. The amplitude of the signal that is passed to the low pass filter 209 will be dependent upon the difference between the resonant frequency of the resonant circuit 205 and the oscillation frequency of the signal generator, which in turn will be dependent upon whether or not a conductor is within close proximity to the inductor 229. In the absence of a conductor in close proximity to the inductor 229, the signal from the resonant circuit 205 will be relatively high in amplitude. However, if a conductor is within close proximity to the inductor 229, the resonant circuit 205 the signal that is passed to the low pass filter 209 will be relatively low in amplitude. The low pass filter 209 has a cut-off frequency which is greater than the oscillation frequency $\omega_1$ of the signal generator 203. The low pass filter 209 therefore prevents high frequency signals from triggering the indicator, and therefore helps to prevent accidental triggering of the indicator.

The rectifier 211 converts an AC signal that has passed through the low pass filter 209 to a DC signal. The amplitude of the DC signal generated by the rectifier 211 will be proportional to the AC signal. Therefore if the output from the resonant circuit 205 is relatively high amplitude, the DC signal will be strong. If the output from the resonant circuit 205 is relatively low amplitude, the DC signal will be weak.

The DC signal generated by the rectifier 211 is passed to the comparator 213. The comparator 213 output is high when the DC signal is strong, and its output is low when the DC signal is weak. Therefore the comparator 213 output is high when the resonant circuit 205 is not in close proximity to a conductor.

When the circuit 101 is initially activated, there may be a temporary surge in the rectifier 211 output. The output of the time delay circuit element 219 is low during the time when the rectifier 211 output may surge. The output switches to high after the time period during which temporary surges in the rectifier 211 output may occur.

The AND gate 221 prevents the switch 215 from being switched on unless both the output from the comparator 213 and the output from the time delay circuit element 219 are high. The time delay circuit element 219 therefore prevents the switch 215 from being triggered by temporary surges in the rectifier 211 output.

The charge pump 225, which is connected in series with the signal generator 203, allows AC signals to pass to the signal-generator-monitoring switch 223. DC signals cannot pass through the charge pump 225. The signal-generator-monitoring switch 223 is switched on by an AC signal, therefore the signal-generator-monitoring switch 223 will only be switched on when an AC signal is being generated by the signal generator and has passed through the charge pump 225.

The indicator 228 is triggered when both the switch 215 and the signal-generator-monitoring switch 223 are switched on. Therefore, in order for the indicator 228 to be triggered, the output from the comparator 213 and the time delay circuit element 219 must be high, indicating that there is not a conductor or inductance-influencing object in close proximity to the inductor 229. The signal-generator-monitoring switch 215 must also be switched on, indicating that a signal is being generated by the signal generator 203. The circuitry described above therefore incorporates a plurality of safety checks to prevent accidental or unintentional triggering of the indicator 228.

Figure 3:
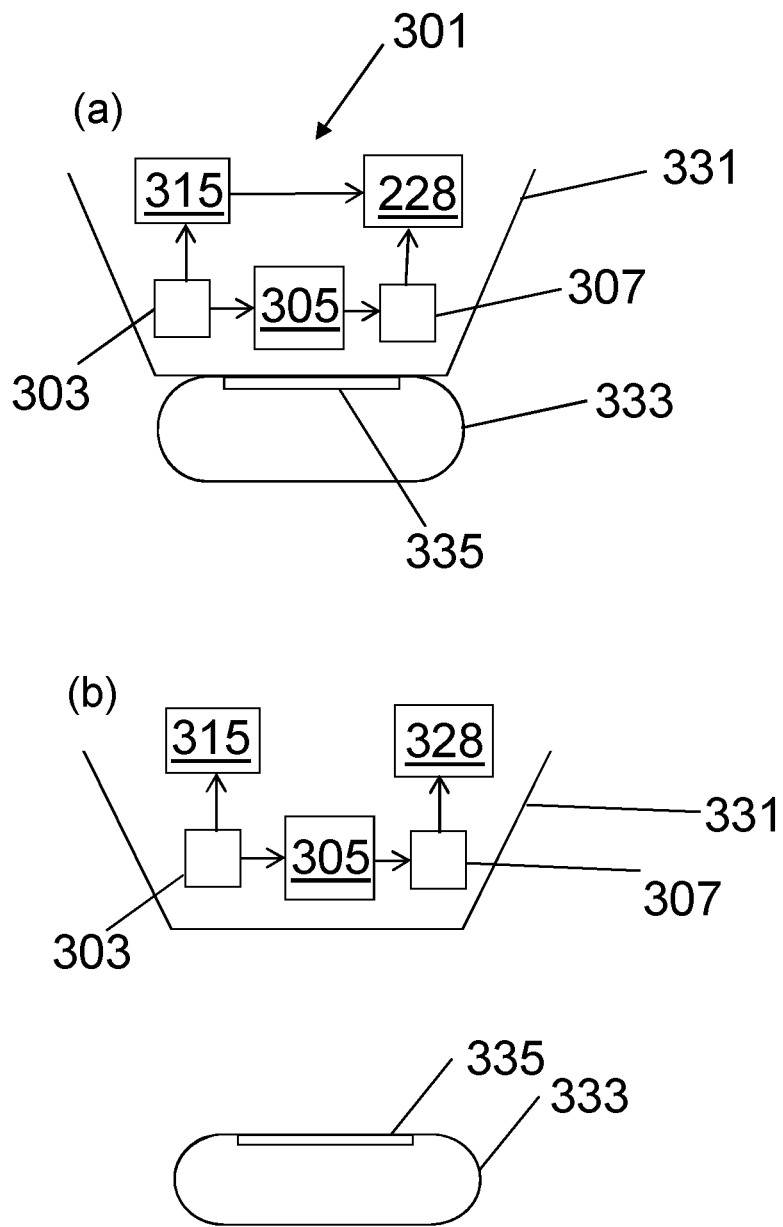
FIG. 3 is a schematic diagram of a store and a launch platform according to an embodiment of the invention.

In another embodiment of the invention (FIG. 3), a circuit 301 including a signal generator 303, a resonant circuit 305, a monitor 307 and an indicator 228, is provided on a first component 331, which in this example is a launch platform. A second component 333, which in this example is a store comprising a conductor 335 is initially attached to or otherwise supported by the launch platform 331 (as indicated in FIG. 3a) and is subsequently deployed from the launch platform 331 (FIG. 3b). Initially, the conductor 335 is in close proximity to the circuit 301 and the conductor will cause a difference in the resonant frequency of the resonant circuit 305. When the signal generator 303 is switched on, the resonant frequency of the resonant circuit 305 will not be equal to the oscillation frequency of the signal from the signal generator 303. The output from the resonant circuit 305 will be relatively low amplitude, and the indicator will not be triggered. When the store 333 is deployed or otherwise separated from the launch platform 331, as shown in FIG. 3b, the resonant frequency of the resonant circuit 305 will match the frequency of the signal generator 303. The output from the resonant circuit 331 will be relatively high amplitude. The monitor 307 includes a filter (not shown), which includes a time delay element, and the circuit includes a signal-generator-monitoring switch 315. If the time delay circuit element output is high, and if the signal-generator-monitoring switch 315 is switched on, the indicator 328 will be triggered, providing an indication that the store 333 has been removed, deployed, or otherwise separated from the launch platform 331. If an initial voltage surge leads to a high rectifier output that is not the result of a resonant frequency generated from the signal generator 303, the time delay circuit element will prevent the indicator 328 from being triggered. If the signal generator 303 is not providing a signal to the resonant circuit 305, the signal-generator-monitoring switch will not be switched on and the indicator 328 will not be triggered.

Figure 4:
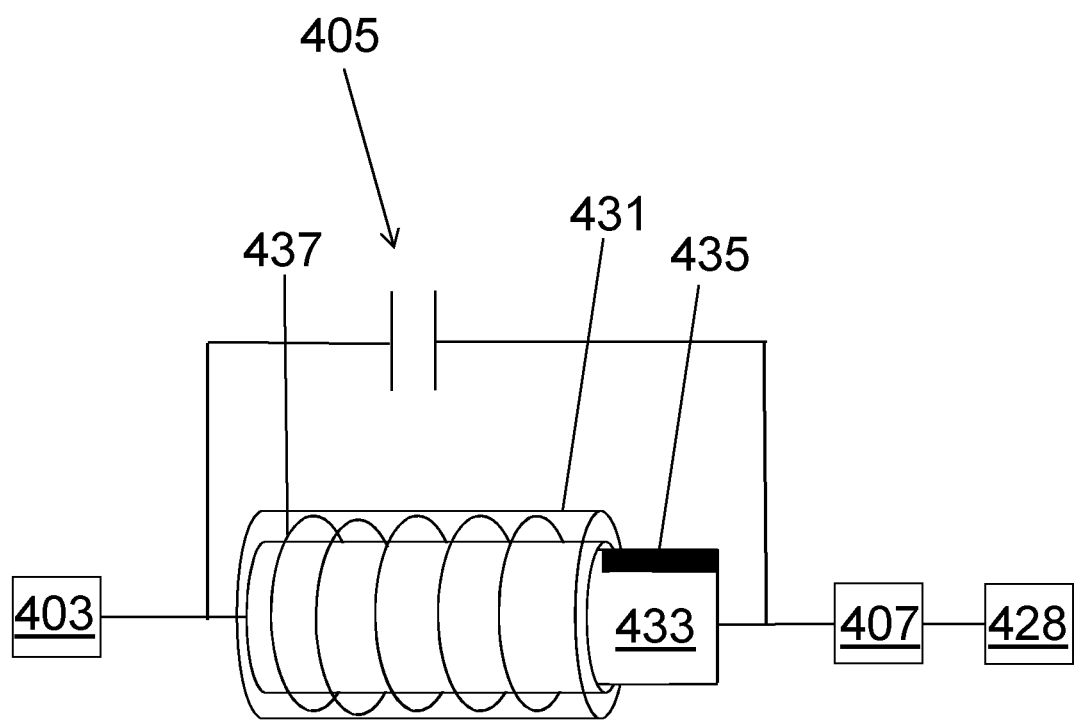
FIG. 4 is a schematic diagram of a launch platform comprising a canister, according to an embodiment of the invention.

An alternative embodiment of the invention is shown in FIG. 4. In this embodiment, the first component comprises a canister 431, and the canister 431 initially houses a second component, which in this example is a store 433. The canister 431 comprises an induction coil 437, and, prior to deployment, the store 433 is housed within the induction coil 437. The store 433 comprises a conductor 435, which will cause a change in the inductance of the induction coil 437 when the store 433 is housed within the induction coil 437. The induction coil forms part of a resonant circuit 405 which is connected to a signal generator 403. Initially, the oscillation frequency of the signal from the signal generator 403 will not match the resonant frequency of the resonant circuit 405. However, when the store is deployed or removed from the canister 431, and the conductor 435 exits the induction coil, the oscillation frequency of the signal from the signal generator 403 will be closer to, or may match the resonant frequency of the resonant circuit 405. The resonant circuit 405 is connected to a monitor 407, which receives an output from the resonant circuit 405. If the resonant frequency of the resonant circuit 405 is sufficiently close to or matches the oscillation frequency of the signal from the signal generator 403, the monitor 407 triggers an indicator 428, indicating that the store 433 has been removed or separated from the canister 431.

Figure 5:
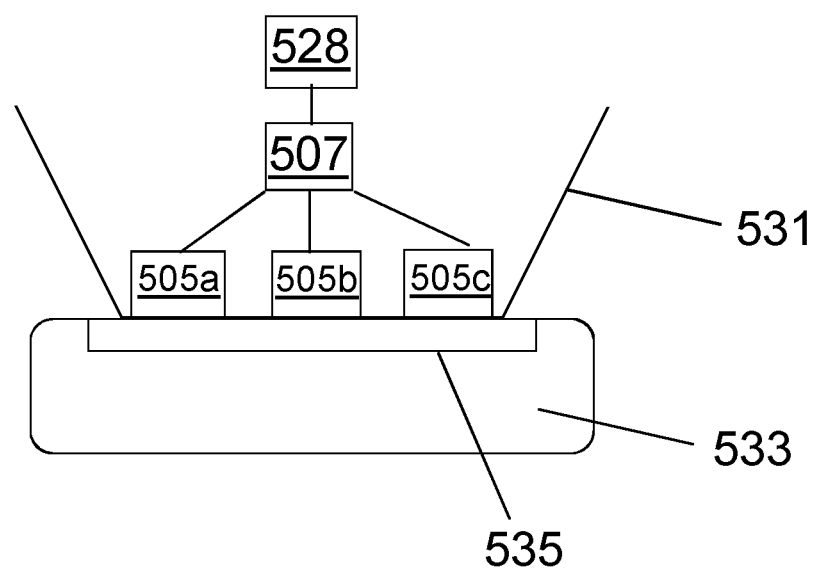
FIG. 5 is a schematic diagram of a launch platform including a plurality of spatially separated resonant circuits, according to an embodiment of the invention.

As shown in FIG. 5, in an embodiment of the invention, a launch platform 531 comprises a plurality of spatially separated resonant circuits 505a, 505b, 505c. A monitor 507 detects a change in output of each of the plurality of resonant circuits 505a, 505b, 505c, caused by separation of a store 533 comprising a conductor 535 from the launch platform 531.

An indicator 528 indicating that the store 533 has been deployed or separated from the launch platform 351 is triggered by the monitor 507 if a change in output of each of the plurality of resonant circuits 605 has been detected. This provides a further safety check, as the indication that the store 533 has been deployed will not occur unless a change in the output of each of the resonant circuits 505 has been detected.

The time at which the output of each of the plurality of resonant circuits 505 changes may be detected by the monitor 507, and may be used to provide an indication of the launch angle of the store 533.

Figure 6A:
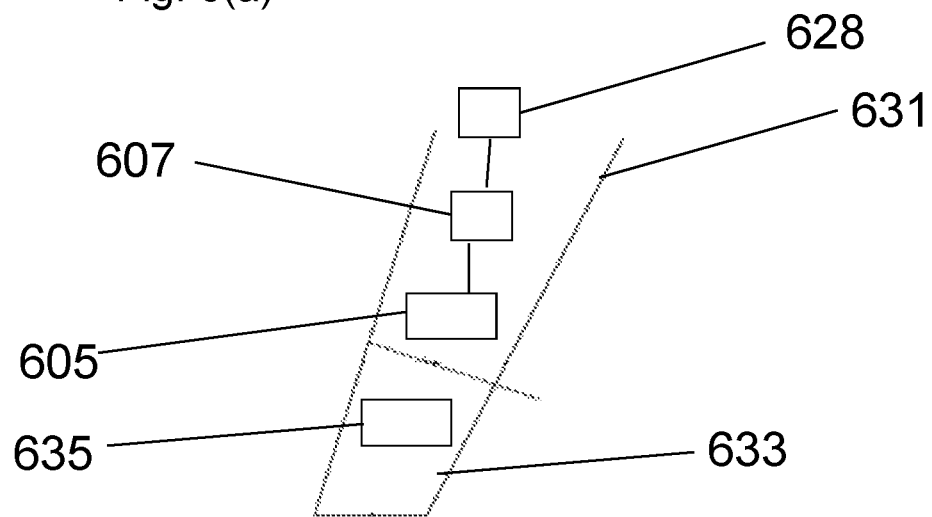
FIG. 6(*a*) is a schematic diagram of wing with a foldable wing tip, according to an embodiment of the invention.
Figure 6B:
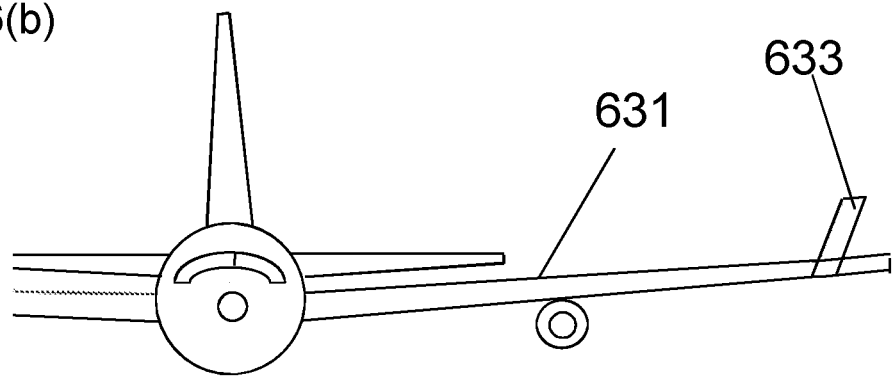

An alternative embodiment of the invention is shown in FIGS. 6(a) and 6(b). In this embodiment, the main body of a wing 631 comprises a resonant circuit 605. The resonant circuit 605 is connected to a monitor 607 which detects a change in the output of the resonant circuit 605. A foldable wing tip 633 comprises a conductor 635. The foldable wing tip 633 is rotatable relative to the main body of the wing 631, as shown in FIG. 6(b). As the foldable wing tip 633 rotates relative to the main body of the wing 631, the relative position of the conductor 635 and the resonant circuit 605 changes. This leads to a change in the output of the resonant circuit 605. The monitor 607 detects the output of the resonant circuit 605, and this allows the angular position of the folding wing tip 633 to be determined. An indicator 628 then provides an indication of the position of the folding wing tip 633.

Figure 7:
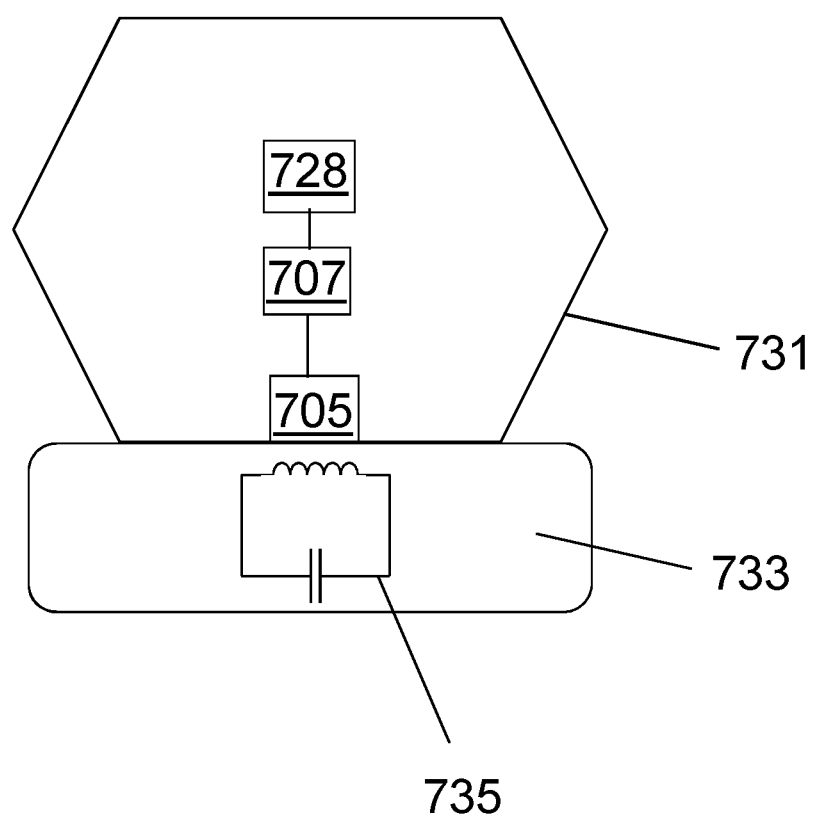
FIG. 7 is a schematic diagram of a launch platform and a store including an LC circuit, according to an embodiment of the invention.

As shown in FIG. 7, in an embodiment of the invention, the store 733 comprises an LC circuit 735 arranged to alter the magnetic flux of the resonant circuit 705 provided on the launch platform 731. The LC circuit 735 causes a difference in the resonant frequency of the resonant circuit when the store object and the launch platform 731 are in close proximity to each other. A monitor 707 detects a change in output of the resonant circuit 705 caused by separation of the store 733 from the launch platform 731. An indicator 728 is triggered by the monitor 707 if a change in output of the resonant circuit 705 is detected, indicating that the store 733 has separated from the launch platform 731.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In further embodiments of the invention, the change in resonant frequency of the resonant circuit may arise as a result of a change in a capacitance of the resonant circuit. For example, the store or the launch platform may include a capacitance plate, and the separation of the store from the launch platform may cause a change in the capacitance of the resonant circuit.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of determining the relative positions of components of a munitions system, the munitions system comprising a first component and at least one second component, the method comprising:
    monitoring the output of a resonant circuit provided on the first component, the resonant circuit having a resonant frequency;
    detecting a change in the output due to a change in the resonant frequency caused by a change in the relative positions of the first component and the at least one second component;
    using the detected change to determine that the at least one second component has moved relative to the first component; and
    monitoring the resonant frequency of the resonant circuit over a period of time, and using detected changes in the resonant frequency to determine movement of the at least one second component relative to the first component, wherein using the detected changes to determine whether the at least one second component has moved relative to the first component comprises determining the separation distance and/or angle of separation between the first component and the at least one second component.

2. The method of claim 1, wherein the change in the resonant frequency is caused by a change in the inductance of the resonant circuit.

3. The method of claim 1, further comprising:
    providing a signal having an oscillation frequency to a resonant circuit, wherein the resonant frequency of the resonant circuit is closer to the oscillation frequency of the signal when the first component is distant from the at least one second component than when the first component is within close proximity to the at least one second component.

4. The method according to claim 3, wherein the oscillation frequency of the signal matches the resonant frequency of the resonant circuit when the first component is distant from the at least one second component.

5. The method of claim 1, wherein the first component comprises at least two resonant circuits, each resonant circuit having a resonant frequency wherein the method comprises:
    monitoring the output of each of the at least two resonant circuits;
    detecting a change in the output of at least one of the resonant circuits, caused by a change in the relative positions of the first component and the at least one second component; and
    using the detected change to determine the angle or orientation of the at least one second component relative to the first component.

6. The method of claim 1, further comprising:
    monitoring the output of a plurality of resonant circuits provided on the first component;
    detecting a change in the output of each of the plurality of resonant circuits caused by separation of the store from the launch platform; and
    using the detected change from each circuit to determine that the at least one second component has moved relative to the first component.

7. The method according to claim 1, wherein the first component and the second component are parts of a vehicle that are operably rotatable relative to each other.

8. The method according to claim 7, further comprising using the detected change to determine whether the at least one second component has rotated relative to the first component.

9. The method according to claim 1, wherein the first component is a store or a launch platform, and wherein the at least one second component is the other of a store or a launch platform.

10. The method of claim 9, wherein the oscillation frequency of the signal matches the resonant frequency of the resonant circuit when the store is distant from the launch platform.

11. A component for a munitions system comprising:
    a signal generator for generating a signal;
    a resonant circuit having a resonant frequency and operably connected to receive the signal from the signal generator and to provide an output;
    a monitor operably connected to monitor the output of the resonant circuit; and
    an indicator operably connected to the monitor and configured to indicate that the output of the resonant circuit has changed, wherein
    the resonant circuit is configured so that its resonant frequency changes when a conductor or other inductance-influencing object moves relative to the component;

wherein the monitor is further configured to monitor the resonant frequency of the resonant circuit over a period of time, and use the detected changes in the resonant frequency to determine movement of a conductor or other inductance-influencing object relative to the component, wherein using the detected changes to determine whether the conductor or other inductance-influencing object has moved relative to the component comprises determining the separation distance and/or angle of separation between the component and the conductor or other inductance-influencing object.

12. The component of claim 11, wherein the monitor includes a comparator and a switch connected for activation by the comparator, wherein the comparator-activated switch is operably connected to the indicator and is configured to be activated if the comparator detects that the output of the resonant circuit has crossed a threshold level.

13. The component of claim 11, wherein the monitor includes a signal-generator-monitoring switch operably connected to the signal generator and to the indicator, wherein the signal-generator monitoring switch is configured to be OFF in the absence of a signal from the signal generator, and thereby to prevent the indicator from activating in the absence of a signal from the signal generator.

14. The component of claim 11, wherein the component is a store, a munition, a sub-munition, a launch platform, a land vehicle, a water vehicle, an aircraft, a man-portable launcher, a canister, a wing, a fin, a railing, a hanger, or a barrel.

15. A first component and a second component of a munitions system, the second component including a conductor or inductance-influencing object, and the first component being a component according to claim 11, wherein the conductor or inductance-influencing object is arranged to cause a difference in the resonant frequency of the resonant circuit when the second component and the first component move relative to one another.

16. A first component and a second component according to claim 15, wherein the conductor or inductance-influencing object comprises a metal, carbon fibre material or a glass fibre material having conducting reinforcing struts or screws.

17. A first component and a second component according to claim 16, wherein the inductance-influencing object includes an LC circuit arranged to alter the magnetic flux of the resonant circuit provided on the store or launch platform.

18. A method of determining the relative positions of components of a munitions system, the munitions system comprising a first component and at least one second component, the method comprising:
monitoring the output of a resonant circuit provided on the first component, the resonant circuit having a resonant frequency;
detecting a change in the output due to a change in the resonant frequency caused by a change in the relative positions of the first component and the at least one second component;
using the detected change to determine that the at least one second component has moved relative to the first component; and
providing a signal having an oscillation frequency to a resonant circuit, wherein the resonant frequency of the resonant circuit is closer to the oscillation frequency of the signal when the first component is distant from the at least one second component than when the first component is within close proximity to the at least one second component.

* * * * *